(12) United States Patent
Hiremath et al.

(10) Patent No.: US 9,367,592 B2
(45) Date of Patent: *Jun. 14, 2016

(54) USING METAPHORS TO PRESENT CONCEPTS ACROSS DIFFERENT INTELLECTUAL DOMAINS

(71) Applicant: International Business Machines Corporation, Armonk, NY (US)

(72) Inventors: Shobha C. Hiremath, Westford, MA (US); Shruti Kumar, Littleton, MA (US); Fang Lu, Billerica, MA (US); Azadeh Salehi, Pepperell, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/075,484

(22) Filed: Nov. 8, 2013

(65) Prior Publication Data
US 2014/0207819 A1 Jul. 24, 2014

Related U.S. Application Data

(63) Continuation of application No. 13/747,702, filed on Jan. 23, 2013, now Pat. No. 9,256,650.

(51) Int. Cl.
*G06F 17/30* (2006.01)
*G06F 17/28* (2006.01)
(Continued)

(52) U.S. Cl.
CPC ...... *G06F 17/30554* (2013.01); *G06F 17/2785* (2013.01); *G06F 17/2795* (2013.01); *G06F 17/2881* (2013.01); *G06F 17/30477* (2013.01); *G06N 5/022* (2013.01)

(58) Field of Classification Search
CPC .......... G06F 17/30554; G06F 17/2795; G06F 17/2785; G06F 17/2881; G06F 17/30477; G06N 5/022
USPC ........................................................ 707/720
See application file for complete search history.

(56) References Cited

U.S. PATENT DOCUMENTS 5,317,687 A * 5/1994 Torres ................... G06F 3/0481
715/823
5,436,830 A    7/1995 Zaltman
(Continued)

FOREIGN PATENT DOCUMENTS

JP    2007-164483 A    6/2007

OTHER PUBLICATIONS

Tarvin, A., "Selecting a Metaphor for Better Presentations", dated Jun. 29, 2009, 4 pages, accessed online at <http://www.humorthatworks.com/how-to/selecting-a-metaphor-for-better-presentations/> on Nov. 13, 2015.*

(Continued)

*Primary Examiner* — Phuong Thao Cao
(74) *Attorney, Agent, or Firm* — Nelson Mullins Riley & Scarborough LLP

(57) ABSTRACT

A method, system, and computer program product for generating content of a topic for an intended audience are described. Topic information regarding a topic to be presented to an intended audience is obtained, as well as knowledge information regarding the intended audience. One or more metaphors relating to the topic and understood by the intended audience can be determined based at least in part on the topic information and the knowledge information. Content can be generated for the topic information based on a comparative analysis of the topic information to at least one of the one or more metaphors.

11 Claims, 6 Drawing Sheets

(51) Int. Cl.
*G06F 17/27* (2006.01)
*G06N 5/02* (2006.01)

(56) References Cited

U.S. PATENT DOCUMENTS

| | | | | |
|---|---|---|---|---|
| 5,442,745 | A * | 8/1995 | Hirose | G06F 3/0481 |
| | | | | 707/E17.009 |
| 5,668,961 | A * | 9/1997 | Healy | G06F 3/0481 |
| | | | | 715/210 |
| 6,076,091 | A | 6/2000 | Fohn et al. | |
| 6,199,034 | B1 * | 3/2001 | Wical | G06F 17/2785 |
| | | | | 704/9 |
| 6,208,985 | B1 * | 3/2001 | Krehel | G06F 17/30398 |
| | | | | 707/767 |
| 6,256,638 | B1 * | 7/2001 | Dougherty | G06K 7/10861 |
| 6,518,979 | B1 | 2/2003 | Spertus et al. | |
| 7,181,438 | B1 * | 2/2007 | Szabo | G06F 17/30522 |
| 8,454,419 | B1 | 6/2013 | Smith et al. | |
| 9,135,242 | B1 * | 9/2015 | Wang | G06F 17/2785 |
| 2003/0009564 | A1 | 1/2003 | Eckel | |
| 2004/0157195 | A1 | 8/2004 | Andresen | |
| 2004/0205635 | A1 | 10/2004 | Pratte | |
| 2005/0276479 | A1 | 12/2005 | Goldberg et al. | |
| 2006/0110715 | A1 * | 5/2006 | Hardy | G06Q 30/00 |
| | | | | 434/236 |
| 2007/0172810 | A1 | 7/2007 | McCallum et al. | |
| 2007/0209004 | A1 * | 9/2007 | Layard | G06F 17/3089 |
| | | | | 715/731 |
| 2007/0260671 | A1 * | 11/2007 | Harinstein | G06Q 30/02 |
| | | | | 709/203 |
| 2007/0277111 | A1 * | 11/2007 | Bennett | G06F 3/04812 |
| | | | | 715/763 |
| 2008/0004901 | A1 | 1/2008 | Leong-Fern et al. | |
| 2008/0091634 | A1 * | 4/2008 | Seeman | G06N 5/022 |
| | | | | 706/59 |
| 2008/0091727 | A1 | 4/2008 | Wynett et al. | |
| 2008/0155479 | A1 * | 6/2008 | Long | G06F 9/4443 |
| | | | | 715/854 |
| 2008/0177510 | A1 | 7/2008 | Jin et al. | |
| 2008/0288437 | A1 | 11/2008 | Siregar | |
| 2009/0208052 | A1 * | 8/2009 | Kaplan | G06F 3/017 |
| | | | | 382/103 |
| 2009/0318209 | A1 * | 12/2009 | Gwaltney | A63F 13/12 |
| | | | | 463/9 |
| 2010/0162176 | A1 | 6/2010 | Dunton | |
| 2010/0321391 | A1 * | 12/2010 | Rubin | G06T 19/00 |
| | | | | 345/441 |
| 2011/0072494 | A1 * | 3/2011 | Sato | G06F 3/0481 |
| | | | | 726/4 |
| 2012/0144247 | A1 | 6/2012 | Brown et al. | |
| 2012/0166180 | A1 * | 6/2012 | Au | G06F 17/274 |
| | | | | 704/9 |
| 2012/0311461 | A1 * | 12/2012 | Granof | G06Q 10/00 |
| | | | | 715/753 |
| 2013/0145293 | A1 * | 6/2013 | Yoakum | G06Q 10/00 |
| | | | | 715/764 |
| 2014/0019119 | A1 | 1/2014 | Liu et al. | |
| 2014/0047022 | A1 * | 2/2014 | Chan et al. | |
| 2014/0096006 | A1 * | 4/2014 | Berglund | G06T 13/80 |
| | | | | 715/732 |
| 2014/0129504 | A1 | 5/2014 | Soon-Shiong | |
| 2014/0207819 | A1 * | 7/2014 | Hiremath | G06F 17/30554 |
| | | | | 707/771 |

OTHER PUBLICATIONS

Rubin et al., "KASER: Knowledge Ampllification by Structured Expert Randomization", IEEE Transactions on Systems, Man, and Cybernetics—Part B: Cybernetics, vol. 34, No. 6, pp. 2317-2329, Dec. 2004.*

Klebanov, et al., "Discourse Topics and Metaphors," In Proceedings of the NAACL HLT Workshop on Computational Approaches to Linguistic Creativity, pp. 1-8, 2009.

Steinhart, E., "NETMET: A Program for Generating and Interpreting Metaphors," Computers and the Humanities 28: pp. 383-392, 1995.

Zizi, et al., "Hypermedia Exploration with Interactive Dynamic Maps," International Journal on Human Computer Studies, vol. 43, Issue 3, 21 pages, Sep. 1995.

Office Action of corresponding U.S. Appl. No. 13/747,702 mailed Mar. 5, 2015, all enclosed pages cited.

Ontanon et al., "Story and Text Generation Through Computational Analogy in the Riu System," Proceedings of the Sixth AAAI Conference on Artificial Intelligence and Interactive Digital Entertainment, 2010, 6 pages.

Allbritton, David W. et al., "Metaphor-Based Schemas and Text Representations: Making Connections Through Conceptual Metaphors," Journal of Experimental Psychology: Learning, Memory, and Cognition, 1995, vol. 21, No. 3, pp. 612-625.

Madsen, Kim Halskov, "A Guide to Metaphorical Design," Communications of the ACM, vol. 37, Issue 12, Dec. 1994, pp. 57-62.

Ohsawa, Yukio et al., "KeyGraph: Automatic Indexing by Co-occurrence Graph based on Building Construction Metaphor," Dept. Systems and Human Science, Graduate School of Engineering Science Osaka University, Osaka, Japan, 7 pages.

Internet Web Page entitled: "KeyGraph: A Graph Analytical Approach for Fast Topic Detection," printed from http://keygraph.codeplex.com, 2 pages, dated Jan. 22, 2013.

Internet Web Page entitled: "Computer Science at IBM Research—Almaden," printed from http://almaden.ibm.com/cs/projects/systemt, 1 page, dated Jan. 22, 2013.

Shutova, Ekaterina V., "Computational Approaches to Figurative Language," printed from http://www.cl.cam.ac.uk/techreports/UCAM-CL-TR-803.pdf, Aug. 2011, 217 pages.

Abel, P., et al., "Automatic Constructions of Dynamic 3D Metaphoric Worlds: An application to network management", printed from http://www.google.com/url?sa=t&rct=j&q=&esrc=s&source=web&cd=10&cts=1331218172194&ved=0CKUBEBYwCQ&url=http%3A%2F%2Fciteseerx.ist.psu.edu%2Fviewdoc%2Fdownload%3Fdoi%3D10.1.1.33.8823%26rep%3Drep1%26type%3Dpdf&ei=x8ZYT_b5lufKsQLznbC6DQ&usg=AFQjCNHLO2S2dnVzcx74j1o8iRz8ggtwZQ.

* cited by examiner

USING METAPHORS TO PRESENT CONCEPTS ACROSS DIFFERENT INTELLECTUAL DOMAINS

CROSS-REFERENCE TO RELATED APPLICATIONS

This patent application is a continuation of copending U.S. patent application Ser. No. 13/747,702, filed on Jan. 23, 2013, and entitled "USING METAPHORS TO PRESENT CONCEPTS ACROSS DIFFERENT INTELLECUTAL DOMAINS," the entirety of which is hereby incorporated by reference as if set forth verbatim herein and relied upon for all purposes.

BACKGROUND

In many scenarios, a person may have difficulty explaining or presenting a concept to another person where the other person is not skilled on the topic or otherwise possesses a different knowledge base. Visual presentation tools for computers can assist in explaining and presenting concepts, but such tools alone may not allow for generating presentations that effectively bridge knowledge gaps between the presenter and intended audience.

BRIEF SUMMARY

Some example embodiments may provide a method for generating content of a topic for an intended audience. The method can include obtaining topic information regarding a topic to be presented to an intended audience and obtaining knowledge information regarding the intended audience. The method can further include determining one or more metaphors relating to the topic and potentially understood by the intended audience based at least in part on the topic information and the knowledge information and generating content for the topic information based on a comparative analysis of the topic information to at least one of the one or more metaphors.

Additional aspects relate to a system for generating content of a topic for an intended audience. The system can include a metaphor determining module configured to select one or more metaphors based at least in part on topic information and knowledge domain information regarding an intended audience, a term correlating module configured to determine one or more terms related to at least one metaphor of the one or more metaphors that correlate to one or more terms of the topic information, and a content generating module configured to prepare content for the topic information targeted to the intended audience based at least in part on the one or more terms related to the metaphor.

Other aspects relate to a computer program product comprising a computer-readable storage medium having computer-executable program code instructions stored therein. The computer-executable program code instructions include program code instructions for obtaining topic information regarding a topic to be presented to an intended audience, obtaining knowledge information regarding the intended audience, determining one or more metaphors relating to the topic and understood by the intended audience based at least in part on the topic information and the knowledge information, and generating content for the topic information based on a comparative analysis of the topic information to at least one of the one or more metaphors.

BRIEF DESCRIPTION OF THE SEVERAL VIEWS OF THE DRAWINGS

Figure 1:
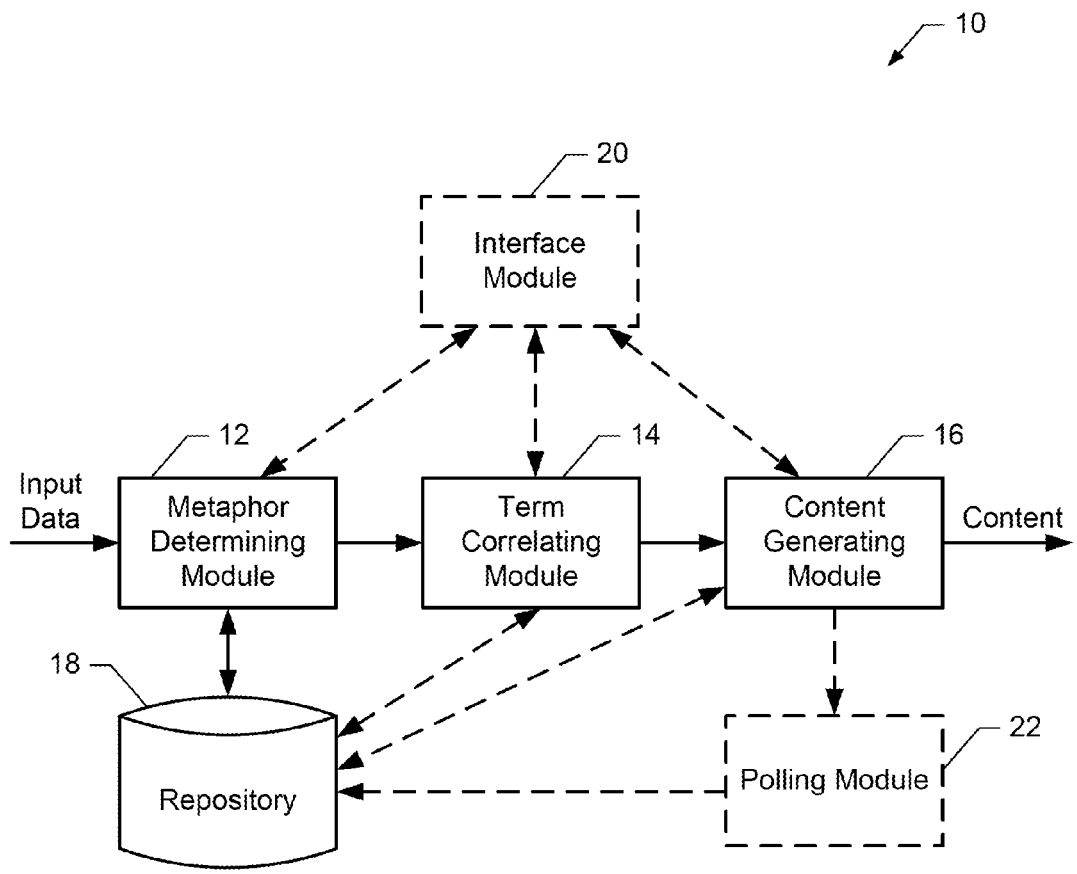
Figure 2:
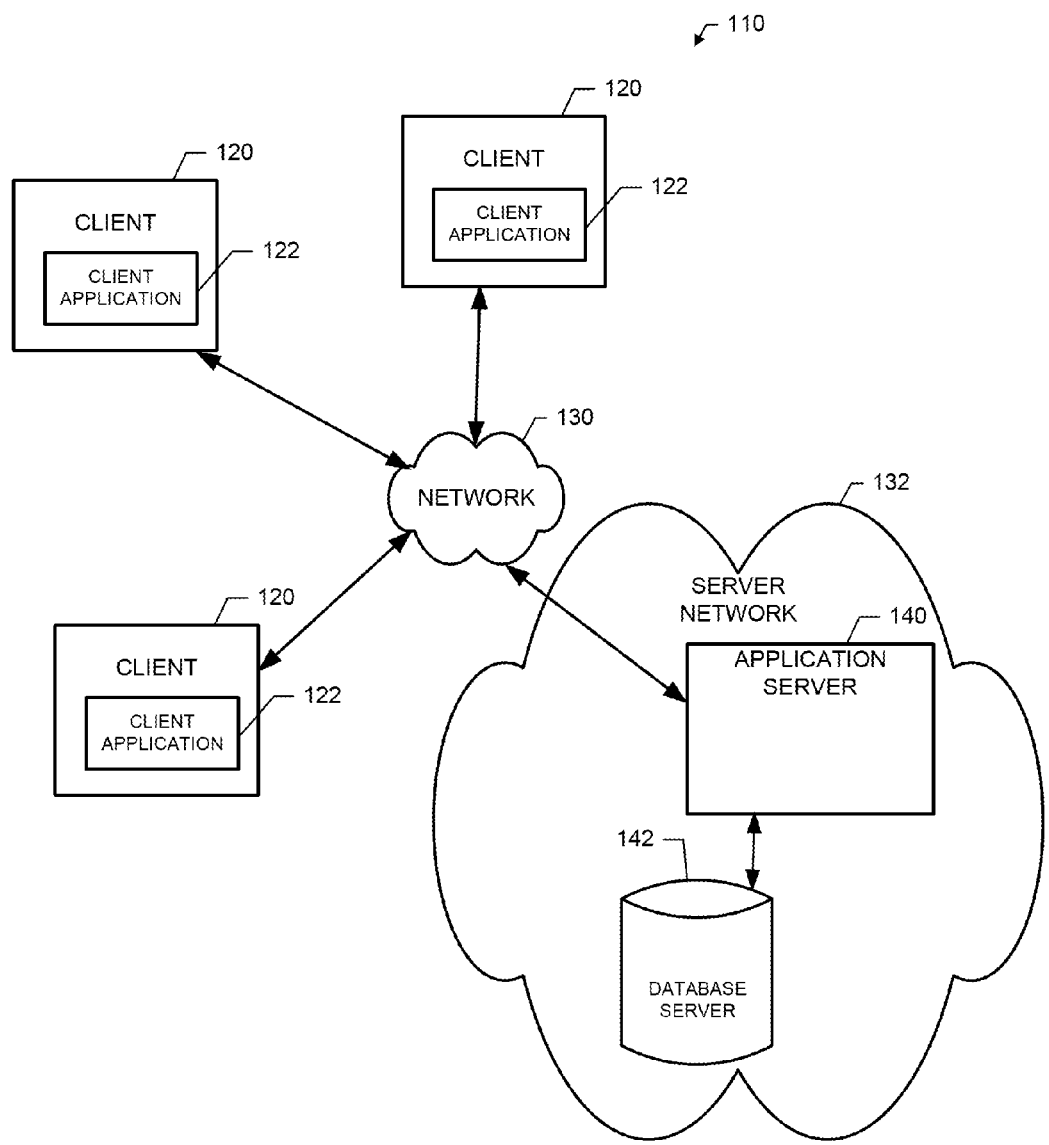
Figure 3:
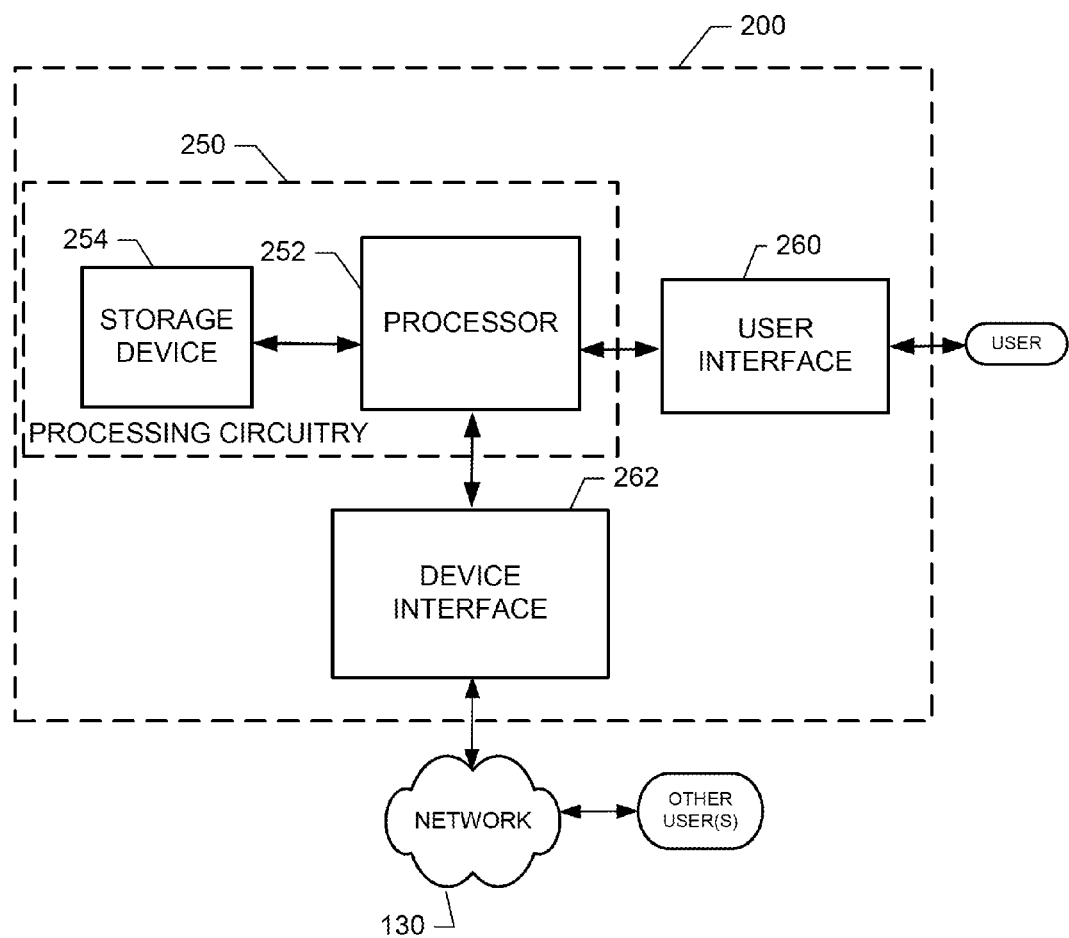
Figure 4:
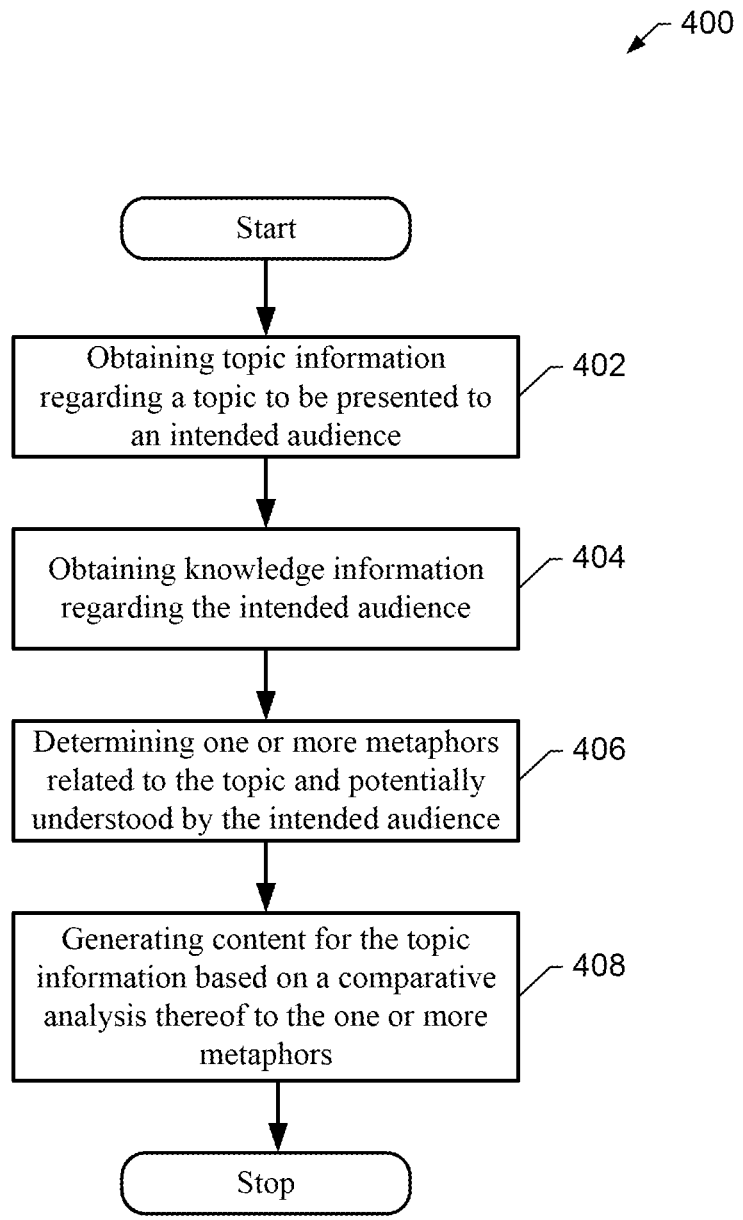
Figure 5:
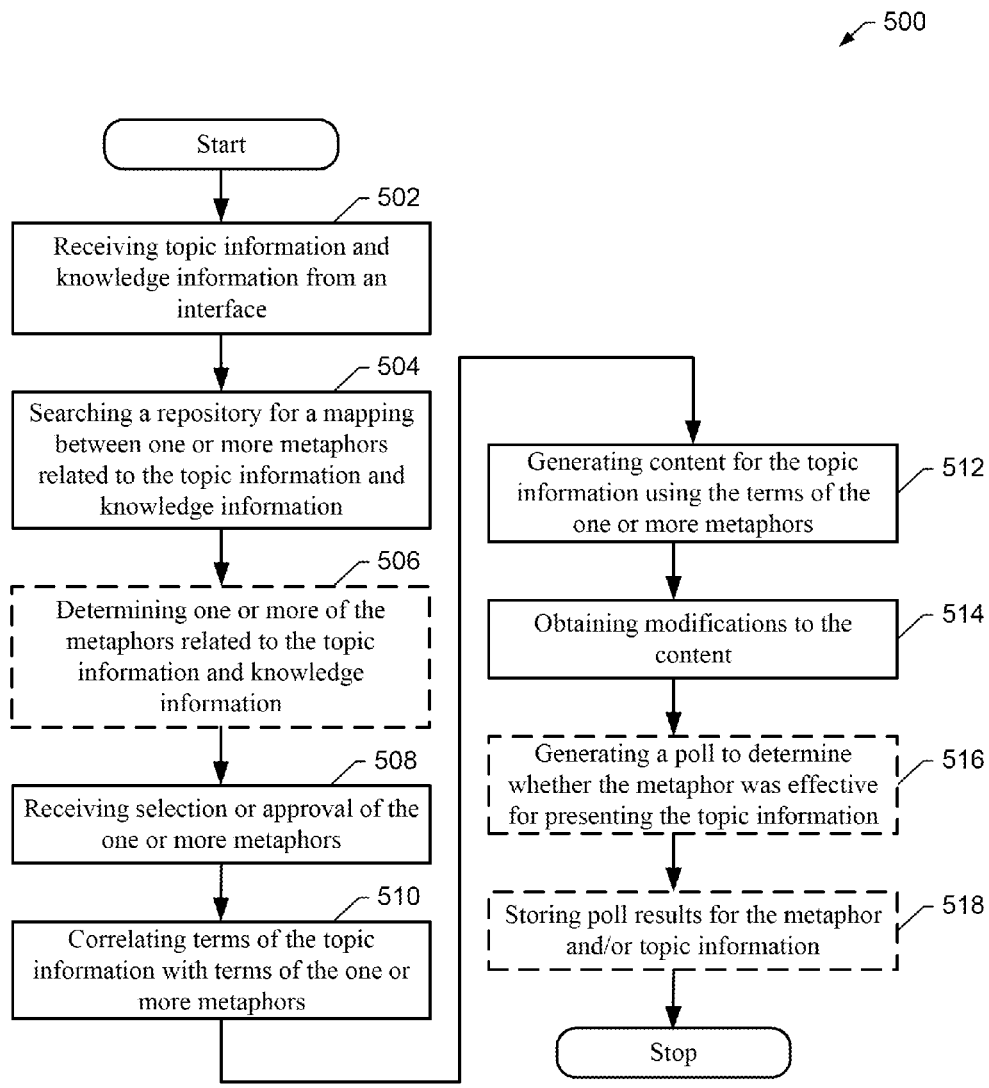
Figure 6:
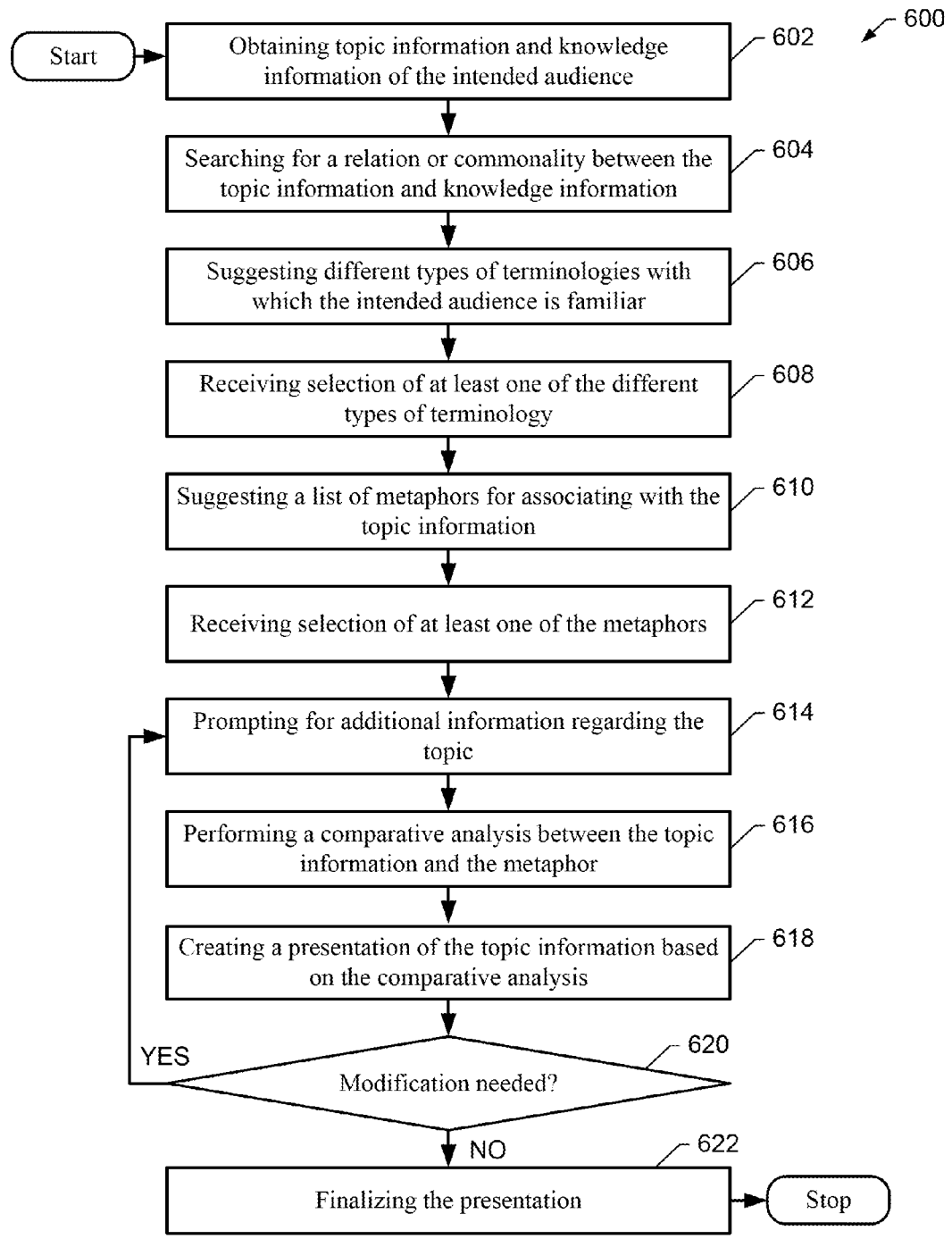

Having thus described example subject matter in general terms, reference will now be made to the accompanying drawings, which are not necessarily drawn to scale, and wherein:

FIG. 1 illustrates an example system for generating content of a topic for an intended audience based on a determined metaphor;

FIG. 2 illustrates a functional block diagram of a system for generating content of a topic according to an example embodiment;

FIG. 3 illustrates a functional block diagram of an apparatus for generating content of a topic according to an example embodiment;

FIG. 4 is a block diagram of an example method for generating content of a topic;

FIG. 5 is a block diagram of an example method for generating content of a topic based on a metaphor; and FIG. 6 illustrates a block diagram of an example method for generating a presentation with topic information targeted to an intended audience.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

People may sometimes find it hard to explain a concept to others having a different knowledge domain or background, even though there may be some overlapping concepts or similarities between their respective domains. For example, it may be difficult for a computer savvy user to example email to a novice user; however, since there are certain similarities between an email system and postal mail, of which the novice user may have knowledge, the user can relate terms of the email system to postal mail, in effect using postal mail as a metaphor, in an effort to explain the concept. For example, the term "email" can correlate to the term "mail," the term "inbox" can correlate to the term "mailbox," the terms "subject" and "recipients" can correlate to the term "envelope," the term "HUB" or "server" can correlate to the term "post office," etc. Thus, the presenter can substitute these terms or otherwise augment an explanation of email using these terms to assist the novice user in understanding the concept of email.

Various examples described herein present aspects for determining a metaphor associated with a topic for presenting and a knowledge domain of an intended audience. Using the metaphor, various terms can be correlated across domains and used in an effort to explain or present the topic to the intended audience. Selection of the metaphor can be based on various inputs specified by a user, for example, such as information regarding the topic for presentation, information regarding the intended audience and/or information regarding the knowledge domain of the intended audience, etc. One or more metaphors can be determined based on the information by searching repositories, lists of previous metaphors used for the topic or a similar topic, preferred terminologies or types of metaphors preferred by the presenter, etc. The metaphors can be presented for selection, in one example, and in any case, at least one of the metaphors is used to determine correlations between terms of the topic and terms understood by the intended audience. The correlated terms are then used to generate a presentation or other explanation of the topic for the intended audience. In one example, members of the intended audience and/or the presenter can be polled to determine whether the presentation was effective in explaining the topic (e.g., and/or whether the selected metaphor allowed for understanding the topic), and responses to the polling can be used in determining whether to recommend the metaphor in future presentations on the topic, and/or for other topics, to intended audiences having a similar knowledge domain.

FIG. 1 illustrates an example system 10 for generating content for explaining a concept based on a determined metaphor. System 10 includes a metaphor determining module 12 configured to select one or more metaphors to assist in explaining a topic to an intended audience, a term correlating module 14 configured to correlate terms of the topic with terms of one or more metaphors understood by the intended audience, and a content generating module 16 configured to create a presentation, explanation, or other content about the topic using the correlated terms. System 10 also includes a repository 18 from which one or more of the metaphor determining module 12, term correlating module 14, and content generating module 16 can obtain additional information to perform functionality described herein. System 10 also optionally includes an interface module 20 configured to provide information from an input source to one or more of the metaphor determining module 12, term correlating module 14, or content generating module 16, and/or to display information therefrom. Moreover, system 10 can optionally include a polling module 22 configured to obtain information regarding content presented by content generating module 16 for use in subsequent metaphor determination.

According to an example, metaphor determining module 12 can obtain input data regarding a topic for presenting to an intended audience and/or additional input data regarding a knowledge domain of the intended audience. In one example, metaphor determining module 12 may receive the input data regarding the topic via interface module 20, which presents an interface prompting for the information. Interface module 20 can provide an interface that prompts for the topic itself, information regarding the topic, such as certain sub-topics or related terms or concepts to be presented to the intended audience, etc. In addition, metaphor determining module 12 may receive the input data regarding the knowledge domain of the intended audience by providing an interface explicitly requesting or otherwise allowing input of knowledge domain parameters, such as an age, reading level, knowledge level regarding the topic, subject expertise area(s) or business area(s), and/or the like. In another example, metaphor determining module 12 may receive or infer such parameters in a survey or questionnaire presented to the intended audience by interface module 20. For example, this can be substantially any type of questionnaire, such as to assess IQ, generation, lifestyle preferences, etc. of the member of the intended audience, and the interface module 20 can present the questionnaire to the member based on subscribing to or otherwise interacting with system 10, in response to an indicated desired to present the topic to the intended audience, etc. In any case, the interface module 20 may obtain the topic information and information regarding the knowledge domain of the intended audience. Whether by interface module 20 or otherwise, metaphor determining module 12 can obtain sufficient information to allow for selecting one or more metaphors that facilitate explaining the topic to the intended audience based on the knowledge domain of the intended audience.

In an example, metaphor determining module 12 can use the input data regarding the topic and knowledge domain of the intended audience to search repository 18 for one or more such metaphors associated with both the topic and the knowledge domain. Metaphor determining module 12 can use various methods of search and/or correlation to determine the appropriate metaphor(s) from repository 18, such as web-based search engines to locate phrases, documents, or other information associating the metaphors to the topic information and/or knowledge domain, mechanisms that mine and/or collect information (e.g., topic detection and tracking (TDT) tasks, such as KeyGraph, etc.), text analysis, statistical data, pattern processing, comparative studies, image comparison, and/or substantially any mechanism that can be used to map metaphors to concepts. Thus, repository 18 can include the World Wide Web, one or more pre-populated databases, and/or substantially any repository. Metaphor determining module 12 can further rank metaphors based on relevancy to the topic information, knowledge domain, etc., and/or based on an effectiveness rating that can be assigned to the metaphor for the topic or other topics, as described herein, in one example.

In addition, in an example, metaphor determining module 12 can use the input data to determine a relationship or other commonality between the topic and the knowledge domain, such as one or more different types of terminologies familiar in the knowledge domain that may be used to explain the topic. Metaphor determining module 12 can similarly acquire the types of terminologies based at least in part on searching, mining, or otherwise leveraging repository 18 to obtain the terminologies based on information regarding the knowledge domain of the intended audience and/or topic information. In this example, the metaphor determining module 12 can present the different types of terminologies using interface module 20 to obtain further input regarding which type of terminology is to be used in determining the appropriate metaphor(s). Thus, metaphor determining module 12 can further utilize input data received regarding the different types of terminologies in obtaining the one or more metaphors from repository 18.

In one example, metaphor determining module 12 determines the one or more metaphors and provides the metaphor(s) to term correlating module 14. In another example, metaphor determining module 12 can present the one or more metaphors using interface module 20 for approval and/or selection. In this example, metaphor determining module 12 can provide conceptual, linguistic, logical, metonymic, and/or other metaphors related to the topic and/or knowledge domain of the intended audience to interface module 20. Interface module 20 can display the metaphors for approval or selection by a user or other entity using the interface. In this example, interface module 20 can provide metaphor determining module 12 with the approved or selected metaphor(s), and the metaphor determining module 12 communicates the approved or selected metaphor(s) to term correlating module 14. Where one or more of the metaphors are rejected, in one example, the metaphor determining module 12 can determine additional metaphors for presenting via interface module 12.

Thus, in an example, term correlating module 14 can receive the one or more metaphors from metaphor determining module 12. In addition, metaphor determining module 12 and/or interface module 20 can provide at least some of the input data to term correlating module 14 as well, such as certain topic information to be presented. In this regard, term correlating module 14 can perform a comparative analysis between the topic information and the metaphor(s) from which content generating module 16 can generate the content. In one example, term correlating module 14 performs the comparative analysis at least in part by associating certain terms of the topic with terms related to the one or more metaphors. Term correlating module 14, in various examples, can determine such associations based on preconfigured mappings of terms between topics and metaphors (e.g., which can have associated data to allow for ranking of the terms, such as an effectiveness rating, etc.), inferences regarding relationships between the terms of the topic information and metaphors (e.g., based on analysis of search results or other data mining based on terms in the topic information and terms of the metaphor), associations specified as part of a previous association between the topic and the metaphor (and/or the topic with a previous metaphor having a predetermined, inferred, etc. association with the current metaphor), and/or the like, as described further in examples presented herein.

Content generating module 16, for example, can create a presentation, explanation, or other content regarding the topic that is targeted for the intended audience using the correlated terms. In this example, content generating module 16 generates the content to explain the concept by using terms associated with the metaphor in place of or as a supplement to terms of the topic. The content can include substantially any graphical, textual, audible, etc. content, and content generating module 16 can generate the content of a specific type based on a configured preference, for example. In additional examples, the content can include other visual representations, such as an augmented reality or other multi-dimensional presentation.

In one example, content generating module 16 can provide output of the content to interface module 20 to allow for modification of the content (e.g., by a presenter). In this example, content generating module 16 may determine such modifications and can accordingly update the generated content and/or associations between the terms of the topic and terms of the metaphor for subsequent content generation (e.g., which can be stored in repository 18 or other data store used by term correlating module 14, metaphor determining module 12, etc.). The generated content can be presented to the intended audience to explain the topic. This can include a computerized graphical presentation, which the content generating module 16 can have generated, an explanation, which can be a document generated by the content generating module 16, or other content, such as an oration given by the presenter based on visual cues generated by the content generating module 16, etc. In addition, for example, content generating module 16 can format the content based on a formatting preference, delivery preference, etc. specified by a user (e.g., via interface module 20).

Moreover, in an example, polling module 22 can obtain data regarding efficacy of the content. This can include a survey or poll solicited to the presenter of the topic, the intended audience, etc. regarding the quality of the content or related materials, a quiz on the topic for the intended audience, and/or the like. Polling module 22 can provide the results to the repository 18 or can otherwise modify associations between the topic information and the metaphor, between the terms of the topic and the correlated terms of the metaphor, and/or the like based on the results of the poll. For example, where members of the intended audience respond to the poll that a certain term was not well explained or understood, polling module 22 can provide this information to the repository 18 (e.g., as an indication that the metaphor or term is not effective or has a certain effectiveness rating), and metaphor determining module 12 can rank metaphors or term correlating module 14 can determine a set of terms to utilize that may not include the term. Moreover, whether or not polling module 22 is present, selection or non-selection of certain metaphors and/or terms by a user (e.g., via interface module 20, as described) can similarly result in metaphor determining module 12, term correlating module 14, etc. updating related parameters in the repository 18, such as providing efficacy information (e.g., effectiveness rating) for the metaphors and/or terms associated with the topic.

In one specific example, a presenter is to present a topic regarding molecular structures in organic chemistry to an elementary school class. In this example, interface module 20 can generate and/or present an interface requesting topic information, information regarding an intended audience, etc. The presenter can use the interface to enter information regarding the topic of molecular structures in organic chemistry, and information specifying the intended audience as school age elementary students. In one example, interface module 20 can infer or otherwise prompt for information regarding the students, such as the sorts of toys they play with, their study environment, their class schedule, etc. This information can be obtained via an interface, inferred based on information previously received for similarly aged children, etc. Interface module 20 can provide the topic information and information regarding the audience to metaphor determining module 12.

Metaphor determining module 12 may search repository 18 for a commonality between molecular structures, or more generally chemical engineering, and terminologies within the knowledge domain of school age elementary students. In an example, as described, metaphor determining module 12 may first provide information regarding types of terminologies to search via interface module 20 (e.g., toys, school subjects, TV shows, etc.), and can receive a selection of one or more types of terminologies via interface module 20 (e.g., toys in this example). Thus, metaphor determining module 12 can first search repository 18 for concepts related to molecular structures, such as molecules, elements, chemical bonds, etc., and can then search for commonality between the concepts and type of terminologies (e.g., toys) understood by the school age elementary students. For example, metaphor determining module 12 may encounter (e.g., in a web search or other data mining) a phrase "the chemical bond can be represented by Lego building blocks."

In this example, metaphor determining module 12 can determine that Lego building blocks are understood by school age elementary students, and can thus determine Lego building blocks as one of one or more possible metaphors for explaining chemical bonds. As described, metaphor determining module 12 can use this metaphor for determining correlated terms between molecular structures and Lego building blocks and/or can present the metaphor to the presenter (e.g., via interface module 20) for approval. In any case, where metaphor determining module 12 associates the Lego building block metaphor with molecular structures, it can provide the metaphor to term correlating module 14. Term correlating module 14 can determine correlations between terms used to describe chemical bonds and terms used in Lego building blocks. As described, this can be based on information in repository 18, which can include predefined mappings between terms (e.g., acquired from similar phrases from a similar source as the phrase relating chemical bonds to Lego building blocks), inferred associations based on information regarding Lego building blocks (e.g., such as description of Lego building block assembly) and/or other topics for which Lego building blocks are a metaphor, etc.

In this specific example, term correlating module 14 can correlate the topic term "element" and/or "chemical" (e.g., referring to periodic elements, such as carbon, hydrogen, etc.) with Lego "blocks," and topic term "bond" with a connection between Lego blocks. Using these correlated terms, content generating module 16 can create a presentation, explanation, etc. of molecular structure using terms of Lego building block assembly in place of, or as a way to define, the terms of the molecular structure topic. In one example, content generating module 16 can generate a guide for explaining molecular structure for the presenter, which can specify the correlated terms and/or how an association can be expressed using the terms of the metaphor. In another example, term correlating module 14 can use image comparison between an image of a molecular bond and an image of a Lego building block assembly to infer an association between elements and Lego blocks, and between bonds and Lego block connections, etc. In this example, content generating module 16 can display images of molecular structures and Lego building block assemblies showing pictorial associations between the items correlated by term correlating module 14. It is to be appreciated that content generating module 16 can generate the content based on multiple parameters, such as a provided or located presentation for molecular structure, which content generating module 16 can modify based on the correlated terms, content located (e.g., in repository 18) regarding using the metaphor to explain the topic, and/or the like.

Various example topical explanations are possible. In another specific example, metaphor determining module 12 can determine a metaphor for explaining topics that are closely related but use slightly different terminology. In one such example, the topic information can relate to one software package, while the knowledge domain of the intended audience relates to another software package. In this example, metaphor determining module 12 determines a metaphor as the knowledge domain software package, and term correlating module 14 can correlate the terms of the topic software package with the terms of the metaphor. For instance, term correlating module 14 may associate a feature "Check-In Files" of a topic source control software package with functionality called "Submit Files" in a knowledge domain source control software package. In this regard, content generating module 16 can generate a manual, presentation, quick-reference sheet, etc., for the knowledge domain source control software package based on the topic source control software package and the correlated terms with the metaphor, as described. In one specific example, term correlating module 14 can determine correlation between terms based on data obtained for the terms (e.g., term correlating module 14 can match a description of "Check-In Files" of the topic source control software package with a description of "Submit Files" in the knowledge domain source control software package based on comparing manuals or other documents located in repository 18 for the software packages).

FIG. 2 illustrates an example system 110 in which an embodiment of the described subject matter may be employed. As shown in FIG. 2, a system 110 according to an example embodiment may include one or more client devices (e.g., clients 120). Notably, although FIG. 2 illustrates three clients 120, it should be appreciated that many more clients 120 may be included in some embodiments and thus, the three clients 120 of FIG. 2 are simply used to illustrate a multiplicity of clients 120 and the number of clients 120 is in no way limiting to other example embodiments. In this regard, example embodiments are scalable to inclusion of any number of clients 120 being tied into the system 110. Moreover, it should be appreciated that FIG. 2 illustrates one example embodiment in which shared resources may be accessed within a community of networked devices (e.g., clients 120). However, it should be appreciated that the architecture of various example embodiments may vary. Thus, the example of FIG. 2 is merely provided for ease of explanation of one example embodiment and should not be considered to be limiting with respect to the architecture of the system 110.

The clients 120 may, in some cases, each be computing devices associated with different individuals, locations or entities within an organization. For example, among the clients 120, one client may be associated with a first facility or location of a first organization. Meanwhile, a second client may be associated with a second facility or location of the first organization. However, in some embodiments, each of the clients 120 may be associated with individuals, locations or entities associated with different organizations. As such, for example, some of the clients 120 may be associated with the first organization, while other ones of the clients 120 are associated with a second organization. Thus, for example, the clients 120 may be remotely located from each other, collocated, or combinations thereof.

Each one of the clients 120 may include or otherwise be embodied as a computing device (e.g., a computer, a network access terminal, a personal digital assistant (PDA), cellular phone, smart phone, or the like) capable of communication with a network 130. As such, for example, each one of the clients 120 may include (or otherwise have access to) memory for storing instructions or applications for the performance of various functions and a corresponding processor for executing stored instructions or applications and a corresponding processor or processing circuitry. Each one of the clients 120 may also include software and/or corresponding hardware for enabling the performance of the respective functions of the clients as described below. In an example embodiment, one or more of the clients 120 may include a client application 122 including software for enabling a respective one of the clients 120 to communicate with the network 130 for requesting and/or receiving information and/or services via the network 130. The information or services receivable at the client applications 122 may include deliverable components (e.g., downloadable software to configure the clients 120, or information for consumption or utilization at the clients 120).

The network 130 may be a data network, such as a local area network (LAN), a metropolitan area network (MAN), a wide area network (WAN) (e.g., the Internet), and/or the like, which may couple the clients 120 to devices such as processing elements (e.g., personal computers, server computers or the like) and/or databases. Communication between the network 130, the clients 120 and the devices or databases (e.g., servers) to which the clients 120 are coupled may be accomplished by either wireline or wireless communication mechanisms and corresponding communication protocols. As such, for example, the network 130 may form a cloud computing environment.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of a service. The cloud model may include at least five characteristics, at least three service models and at least four deployment models.

Some of the characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In an example embodiment, devices to which the clients 120 may be coupled via the network 130 may include a server network 132 including one or more application servers (e.g., application server 140), and/or a database server 142, which together may form respective elements of a server network 132. Although the application server 140 and the database server 142 are each referred to as "servers," this does not necessarily imply that they are embodied on separate servers or devices. As such, for example, a single server or device may include both entities and the database server 142 could merely be represented by a database or group of databases physically located on the same server or device as the application server 140. The application server 140 and the database server 142 may each include hardware and/or software for configuring the application server 140 and the database server 142, respectively, to perform various functions. As such, for example, the application server 140 may include processing logic and memory enabling the application server 140 to access and/or execute stored computer readable instructions for performing various functions.

In an example embodiment, one function that may be provided by the application server 140 may include one or more of the modules shown and described in FIG. 1, such as a metaphor determining module 12, term correlating module 14, content generating module 16, repository 18, interface module 20, polling module 22, etc. As an example, the application server 140 may be configured to provide clients 120 with access to the one or more of the modules for generating content related to a topic and knowledge domain of an intended audience as described above by executing the modules from the cloud. In another example, client application 122 can include or receive certain functions of the modules or the modules themselves.

In an example embodiment, the application server 140 may include or have access to memory (e.g., internal memory or the database server 142) for storing instructions or applications for the performance of various functions and a corresponding processor for executing stored instructions or applications or information of repository 18. For example, the memory may store an instance of one or more of the metaphor determining module 12, term correlating module 14, content generating module 16, interface module 20, polling module 22, etc. configured to operate in accordance with an example embodiment. In this regard, for example, the metaphor determining module 12, term correlating module 14, content generating module 16, repository 18, interface module 20, polling module 22, etc. may include software for enabling the application server 140 to communicate with the network 130 and/or the clients 120 for the provision and/or receipt of information associated with performing activities as described herein.

Referring now to FIG. 3, an apparatus 200 for providing content related to a topic and a knowledge domain of an intended audience, as described herein, is provided. The apparatus 200 may be a cloud computing node, in some embodiments. However, since not all embodiments are necessarily practiced in a cloud computing environment, it should be appreciated that the apparatus 200 is not necessarily a cloud computing node in all example embodiments. The apparatus 200 may be, or may provide, an embodiment of one or more or a collection of described modules or other components, such as metaphor determining module 12, term correlating module 14, content generating module 16, repository 18, interface module 20, polling module 22, etc. In some embodiments, the apparatus 200 may be a personal computer system, server computer system, thin client, thick client, handheld or laptop device, multiprocessor system, microprocessor-based system, set top box, programmable consumer electronic device, network PC, minicomputer system, mainframe computer system, distributed cloud computing environment that includes and of the above systems or devices, and/or the like (e.g., one of the clients 120 or a server of the server network 132). The apparatus 200 may function, according to its configuration, as any of a number of different entities. As such, configuration of the apparatus 200 as described herein may transform the apparatus 200 into one or more of metaphor determining module 12, term correlating module 14, content generating module 16, repository 18, interface module 20, polling module 22, etc. In some cases, configuration of the apparatus 200 may be accomplished via executable instructions such as program modules executed by a computer system. The program modules may include routines, programs, objects, components, logic, data structures, and so on that perform particular tasks or implement particular abstract data types.

In an example embodiment, the apparatus 200 may include or otherwise be in communication with processing circuitry 250 that is configured to perform data processing, application execution and other processing and management services according to an example embodiment. In one embodiment, the processing circuitry 250 may include a storage device 254 and a processor 252 (which may itself include one or more processors) that may be in communication with or otherwise control a user interface 260 and a device interface 262. As such, the processing circuitry 250 may be embodied as a circuit chip (e.g., an integrated circuit chip) configured (e.g., with hardware, software or a combination of hardware and software) to perform at least a portion of operations described herein. However, in some embodiments, the processing circuitry 250 may be embodied as a portion of a server, computer, laptop, workstation or even one of various mobile computing devices. In situations where the processing circuitry 250 is embodied as a server or at a remotely located computing device, the user interface 260 may be disposed at another device (e.g., at a computer terminal or network access terminal) that may be in communication with the processing circuitry 250 via the device interface 262 and/or a network (e.g., network 130).

Internal communication among components of the apparatus 200 may be accomplished via a communication bus. Such a communication bus may represent one or more of several types of bus structures, including a memory bus or memory controller, a peripheral bus, an accelerated graphics port, and a processor or local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The user interface 260 may be in communication with the processing circuitry 250 to receive an indication of a user input at the user interface 260 and/or to provide an audible, visual, mechanical or other output to the user. As such, the user interface 260 may include, for example, a keyboard, a mouse, a joystick, a display, a touch screen, a microphone, a pointing device, a speaker, or other input/output mechanisms. In embodiments where the apparatus is embodied at a server or other network entity, the user interface 260 may be limited or even eliminated in some cases. Alternatively, as indicated above, the user interface 260 may be remotely located. The user interface 260 can be similar to or can implement functionality described with respect to interface module 20.

The device interface 262 may include one or more interface mechanisms for enabling communication with other devices and/or networks. In some cases, the device interface 262 may be any means such as a device or circuitry embodied in either hardware, software, or a combination of hardware and software that is configured to receive and/or transmit data from/to a network and/or any other device or module in communication with the processing circuitry 250. In this regard, the device interface 262 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 262 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 254 may include one or more non-transitory storage or memory devices such as, for example, volatile and/or non-volatile memory that may be either fixed or removable. As such, the storage device 254 may include random access memory (RAM) and/or cache memory. In some embodiments, the storage device 254 may be a magnetic disk drive or an optical disk drive (e.g., CD ROM, DVD ROM and/or the like). The storage device 254 may be configured to store information, data, applications, program modules, instructions or the like for enabling the apparatus to carry out various functions in accordance with example embodiments described herein. For example, the storage device 254 could be configured to buffer input data for processing by the processor 252. Additionally or alternatively, the storage device 254 could be configured to store instructions for execution by the processor 252. As yet another alternative, the storage device 254 may include one of a plurality of databases that may store a variety of files, contents or data sets. Among the contents of the storage device 254, applications may be stored for execution by the processor 252 in order to carry out the functionality associated with each respective application. Moreover, for example, storage device 254 can be at least part of a repository 18.

The processor 252 may be embodied in a number of different ways. For example, the processor 252 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 252 may be configured to execute instructions stored in the storage device 254 or otherwise accessible to the processor 252. As such, whether configured by hardware or software methods, or by a combination thereof, the processor 252 may represent an entity (e.g., physically embodied in circuitry) capable of performing operations according to example embodiments while configured accordingly. Thus, for example, when the processor 252 is embodied as an ASIC, FPGA or the like, the processor 252 may be specifically configured hardware for conducting the operations described herein. Alternatively, as another example, when the processor 252 is embodied as an executor of software instructions, the instructions may specifically configure the processor 252 to perform the operations described herein.

In an example embodiment, the processor 252 (or the processing circuitry 250) may be embodied as, include or otherwise control one or more modules or other components, such as metaphor determining module 12, term correlating module 14, content generating module 16, repository 18, interface module 20, polling module 22, etc., which may be any means such as a device or circuitry operating in accordance with software or otherwise embodied in hardware or a combination of hardware and software (e.g., processor 252 operating under software control, the processor 252 embodied as an ASIC or FPGA specifically configured to perform the operations described herein, or a combination thereof) thereby configuring the device or circuitry to perform the corresponding functions, as described herein.

In some embodiments, the apparatus 200 may operate based on a set of functional abstraction layers including, for example, a hardware and software layer, a virtualization layer, a management layer and/or a workload layer. In an example embodiment, the hardware and software layer may be provided via a plurality of hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The virtualization layer may provide an abstraction layer from which the following examples of virtual entities may be provided: virtual servers; virtual storage; virtual networks, including virtual private networks; virtual applications and operating systems; and virtual clients. In one example, the management layer may provide any of a number of functions including, for example, resource provisioning metering and pricing, billing or invoicing, security user portal provides access, service level management, Service Level Agreement (SLA) planning and fulfillment, and/or the like. The workloads layer may provide examples of functionality for which the cloud computing environment may be utilized. Examples of workloads and functions which may be provided from this layer include provision of a tool for discovery and realization of business measurement concepts using industry models.

From a technical perspective, the apparatus 200 described above may be configured accordingly to be used to support some or all of the operations described herein in relation to various modules, such as metaphor determining module 12, term correlating module 14, content generating module 16, repository 18, interface module 20, polling module 22, etc. As such, the platform described in FIG. 3 may be used to facilitate the implementation of several computer program and/or network communication based interactions.

As will be appreciated by one skilled in the art, aspects described herein may be embodied as a system, method, or computer program product. Accordingly, described aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, described aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the described subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain aspects are described below with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An example method 400 according to one example embodiment will now be described in reference to FIG. 4. The method of FIG. 4 may be executed by various modules described herein. The method 400 may include obtaining topic information regarding a topic to be presented to an intended audience at operation 402. The method 400 may further include obtaining knowledge information regarding the intended audience at operation 404. Both operations 402 and 404 can be performed by utilizing an interface that can facilitate obtaining the information based on one or more related prompts. The method 400 may also include determining one or more metaphors related to the topic and potentially understood by the intended audience at operation 406. The one or more metaphors can be determined from a repository based on the topic information and knowledge information, based on a specified type of terminology, etc., as described. In addition, determined metaphors can be presented for approval and/or selection, in one example. The method 400 includes generating content for the topic information based on a comparative analysis thereof to the one or more metaphors at operation 408. The comparative analysis can include associating terms of the topic information with terms of the metaphor, as described herein, to allow for generation of the content based on the terms of the metaphor.

Another example method 500 according to an embodiment will now be described in reference to FIG. 5. The method of FIG. 5 may be executed by various modules, as described herein. The method 500 may include receiving topic information and knowledge information from an interface at operation 502. The method 500 can also include searching a repository for a mapping between one or more metaphors related to the topic information and knowledge information at 504. As described, the mapping can be generated before the searching occurs and can be based on previous associations of the metaphors for presenting the topic information and/or for presenting to an audience with similar knowledge information. In another example, the mapping can be searched and determined based at least in part on a commonality between the topic information and knowledge information using TDT tasks, such as KeyGraph, text analysis, statistical data, pattern processing, comparative studies, image comparison, and/or substantially any mechanism that can be used to map metaphors to concepts, as explained above. The method 500 also includes optionally determining one or more of the metaphors related to the topic information and knowledge information at operation 506. This can include determining a subset of the metaphors based on at least one of results of comparative analyses described above, further analyses to determine most likely metaphors for describing the topic information (e.g., based on similar terms between the topic information and metaphors), a previous ranking for explaining the topic information and/or for presenting to an audience with similar knowledge information, and/or the like. Metaphors can be further presented on an interface for selection or approval, for example, and the method 500 also includes receiving selection or approval of the one or more metaphors at operation 508. The method 500 further includes correlating terms of the topic information with terms of the one or more metaphors at operation 510. This can include searching for common aspects of the terms, obtaining a mapping of metaphor terms to topic terms, inferring relationships between the terms, etc.

Moreover, the method 500 includes generating content for the topic information using the terms of the one or more metaphors at operation 512. The generated content can be a presentation, explanation, etc., as described, where metaphor terms are used to describe the topic. The method further includes obtaining modification to the content at operation 514. Any modifications can be incorporated into the content and/or can result in generation of information for subsequent metaphor and/or term determination. The method 500 optionally includes generating a poll to determine whether the metaphor was effective for presenting the topic information at operation 516, and storing poll results for the metaphor and/or topic information at 518. In this regard, the poll results are used in subsequent determination of the metaphor for use with the topic or other topics (e.g., if the poll indicates the metaphor was effective, the metaphor can be recommended for further use with the topic or other topics).

Yet another example method 600 according to an embodiment will now be described in reference to FIG. 6. The method of FIG. 6 may be executed by various modules, as described herein. The method 600 can include obtaining topic information and knowledge information of the intended audience at operation 602. The method 600 can also include searching for a relation or commonality between the topic information and knowledge information at operation 604. This can include searching a repository for mappings between the topic information and knowledge information, performing web searches or other data mining to infer relations, etc., as described. The method 600 further includes suggesting different types of terminologies with which the intended audience is familiar at operation 606. For example, this can be based on the determined relation or commonality, and the terminologies can be presented for selection. Thus, the method 600 also includes receiving selection of at least one of the different types of terminology at operation 608. The method additionally includes suggesting a list of metaphors for associating with the topic information at operation 610. The metaphors can be suggested based on selected types of terminology.

The method 600 includes receiving selection of at least one of the metaphors at operation 612, where the metaphors can be listed on an interface to facilitate selection. It is to be appreciated that one or more metaphors can be rejected, which can cause suggesting additional metaphors for selection until a metaphor is chosen. The method 600 also includes prompting for additional information regarding the topic at operation 614. In this regard, the additional information can be presented in the form of a presentation of the topic, certain terms associated with the topic, and/or the like. The method 600 includes performing a comparative analysis between the topic information and the metaphor at operation 616. This can include matching received or determined terms of the topic with terms of the metaphor. The method 600 further includes creating a presentation of the topic information based on the comparative analysis at operation 618. This can include replacing terms of the topic in a provided presentation with terms of the metaphor, augmenting the presentation to explain the topic terms using the metaphor terms, generating a new presentation, and/or the like. The method 600 also includes determining if modification is needed at operation 620. This can be based on providing the presentation via an interface component to allow interaction and possible modification. If modifications are indicated, the method 600 proceeds to operation 614 to again prompt for additional information regarding the topic. If no modifications are needed, the method 600 includes finalizing the presentation at operation 622.

In an example embodiment, an apparatus for performing the methods of FIGS. 4-6 above may comprise a processor (e.g., the processor 252) configured to perform some or each of the operations described above. The processor may, for example, be configured to perform the operations by performing hardware implemented logical functions, executing stored instructions, executing algorithms for performing each of the operations, etc.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many modifications and other embodiments set forth herein will come to mind to one skilled in the art to which the described subject matter pertains having the benefit of the teachings presented in the foregoing descriptions and the associated drawings. Therefore, it is to be understood that the subject matter described herein is not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for generating content of a topic for an intended audience, comprising:
    obtaining topic information regarding a topic to be presented to an intended audience;
    obtaining knowledge information regarding the intended audience;
    determining, using a processor, one or more metaphors relating to the topic and potentially understood by the intended audience based at least in part on the topic information and the knowledge information, wherein a metaphor of the one or more metaphors is a term, phrase, or image which when applied to the topic information suggests a resemblance to the topic information, but is not literally relevant to the topic information;
    determining, using a processor, one or more terms related to at least one metaphor of the one or more metaphors that correlate to one or more terms of the topic information, wherein the determining one or more terms comprises performing a comparative analysis between the topic information and the at least one metaphor; and
    preparing, using a processor, content for the topic information targeted to the intended audience based at least in part on the one or more terms related to the at least one metaphor.

2. The method of claim 1, wherein the determining the one or more metaphors comprises searching one or more repositories for a relation between the topic information and the knowledge information.

3. The method of claim 2, wherein the searching the one or more repositories comprises searching for the relation between the topic information and one or more types of terminologies related to the knowledge information, wherein the determining one or more metaphors is based at least in part on the one or more types of terminologies.

4. The method of claim 3, further comprising obtaining a selection of the one or more types of terminologies from an interface.

5. The method of claim 1, further comprising:
    presenting the one or more metaphors on an interface; and
    obtaining a selection of the at least one metaphor from the interface.

6. The method of claim 5, further comprising modifying a parameter of the at least one metaphor in a repository based on the selection of the at least one metaphor from the interface, wherein the one or more metaphors are determined at least in part from the repository.

7. The method of claim 1, wherein the comparative analysis comprises matching one or more terms of the topic information to one or more terms regarding the at least one metaphor.

8. The method of claim 7, further comprising receiving additional information regarding the topic from a user interface, wherein the preparing the content is further based on the additional information.

9. The method of claim 1, wherein the knowledge information comprises an age, reading level, knowledge level regarding the topic information, subject expertise area, or business area of the intended audience.

10. The method of claim 1, further comprising providing a questionnaire to a member of the intended audience, wherein the knowledge information is obtained or inferred from at least a portion of the questionnaire.

11. The method of claim 1, wherein performing the comparative analysis comprises associating terms of the topic information with terms related to the one or more metaphors based on a preconfigured mapping between topics and metaphors.

\* \* \* \* \*